United States Patent [19]

Malpass

[11] Patent Number: 4,500,648
[45] Date of Patent: Feb. 19, 1985

[54] LONG CHAIN BRANCHING IN POLYOLEFINS FROM ZIEGLER-NATTA CATALYSTS

[75] Inventor: Dennis B. Malpass, LaPorte, Tex.

[73] Assignee: Exxon Research & Engineering Co., Florham Park, N.Y.

[21] Appl. No.: 488,321

[22] Filed: Apr. 25, 1983

[51] Int. Cl.³ ............................ C08F 4/62; C08F 4/64; C08F 4/68; C08F 4/70
[52] U.S. Cl. .................................... 502/115; 502/103; 502/109; 502/110; 502/117; 502/134; 526/125; 526/153; 526/352
[58] Field of Search ............... 502/115, 134, 103, 110, 502/117, 109

[56] References Cited

U.S. PATENT DOCUMENTS

| | | | |
|---|---|---|---|
| 3,149,136 | 9/1964 | Bruce et al. | 260/448 |
| 3,910,870 | 10/1975 | Lutze et al. | 502/103 X |
| 3,910,979 | 10/1975 | Eidt | 502/103 X |
| 4,027,089 | 5/1977 | Aishima et al. | 526/127 |
| 4,170,603 | 10/1979 | Fannin | 502/103 X |
| 4,187,197 | 2/1980 | Kabanov et al. | 502/117 |

FOREIGN PATENT DOCUMENTS

| | | |
|---|---|---|
| 901148 | 3/1961 | United Kingdom . |
| 1333098 | 10/1973 | United Kingdom . |
| 1379853 | 1/1975 | United Kingdom . |

OTHER PUBLICATIONS

*Organoaluminum Compounds*, Mole et al. pub. by Elsevier Pub. Co., New York, (1972), p. 67.

*Primary Examiner*—Patrick Garvin
*Attorney, Agent, or Firm*—M. B. Kurtzman

[57] ABSTRACT

Generally, linear polyethylene containing long chain branching is obtained by polymerizing ethylene in the presence of a catalyst comprising a transition metal compound such as titanium chloride, an organoaluminum compound represented by the formula $R_1R_2AlR_p$ wherein $R_1$ & $R_2$ are the same or different hydrocarbyl groups having from 1 to 18 carbon atoms and $R_p$ is a polymeric hydrocarbyl group containing long chain branching and an aluminum alkyl cocatalyst.

10 Claims, No Drawings

LONG CHAIN BRANCHING IN POLYOLEFINS FROM ZIEGLER-NATTA CATALYSTS

BACKGROUND OF THE INVENTION

1. Field of the Invention

The present invention relates to novel organometallic compounds and, more particularly, to novel polymeric organoaluminum hydrocarbyl compounds in which at least one valence of the metal is satisfied by a low density polyethylene radical. The invention further relates to Ziegler-Natta type catalysts systems comprising a transition metal compound, an organometallic catalyst and the novel organoaluminum compounds containing the low density polyethylene radical. The invention also relates to polyethylenes obtained by polymerizing ethylene in the presence of the catalyst system.

It is well known that the molecular weight and long chain branching of polyethylene are factors affecting die swell during the extrusion of the polyethylene to form polymeric articles. Excessive die swell may result in overweight parts, high head pressure, excessive flashing and parison stability problems; insufficient swell may result in underweight parts, nonuniform wall thickness as well as other related problems. Although die swell can be controlled by controlling the shear rate during extrusion, it would be advantageous to control die swell through modification of the polymer to be extruded.

Accordingly, it would be desirable to produce a polymer composition which would evidence suitable die swell at for example a shear rate of 300 sec$^{-1}$.

2. Description of the Prior Art

In U.S. Pat. No. 3,149,136 there is described organometallic aluminum compounds wherein the repeating units contain an aluminum atom. The polymeric compounds are produced by contacting a diene, such as isoprene, with an aluminum trialkyl, for example aluminum triisobutyl.

In British No. 1,333,098 there is described a process for the production of polymeric organoaluminum compounds by contacting a dialkylaluminum hydride such as diisobutylaluminum hydride with isoprene. The alkyl aluminum polymers are employed in combination with transition metal halides to form a catalyst system for the polymerization of mono-olefins and diolefins and for copolymerizing two or more such olefins.

British No. 901,148 teaches a method of producing branched polyethylene from linear polyethylene by treatment of the polyethylene melt with oxygen at 160° to about 280° C. An objective of the invention described in the patent is the conversion of high density polyethylene to low density polyethylene.

In British No. 1,379,853 it is taught that the flow properties of molten polymers are improved by introducing small amounts of long chain branches into high density linear polyethylene. The introduction of the long chain branches is accomplished without affecting rigidity and density. The patentees accomplish the introduction by reacting high density polyethylene with about 0.05 to 10 weight percent of peroxides based on the polyethylene.

It would be highly desirable to be able to introduce small amounts of long chain branches into the linear polyethylene during the catalytic polymerization of ethylene to polyethylene thereby avoiding the additional steps required in modification of linear polyethylene by chemical reaction.

SUMMARY OF THE INVENTION

It is an objective of this invention to provide linear polyethylenes having a small amount of long chain branching. More particularly, it is an objective of this invention to introduce the long chain branching during the catalytic polymerization of ethylene to polyethylene so as to obtain a polymer with improved processing characteristics.

It is a further objective of the present invention to provide a catalyst system which can be usefully employed for the catalytic polymerization of ethylene to linear polyethylene containing a small amount of long chain branching. It is yet another objective of this invention to provide an aluminum alkyl co-catalyst wherein at least one of the valences of the aluminum is satisfied by a low density polyethylene.

It has been discovered that an organoaluminum compound of the general formula $R_1R_2AlR_p$ wherein $R_1$ and $R_2$ are the same or different hydrocarbyl groups having from 1 to about 18 carbon atoms and $R_p$ is a monovalent polymeric hydrocarbyl group having a weight average molecular weight of at least 1000 to about 100,000 and a long chain branching frequency of from about 0.0005 to about 0.005 per unit molecular weight can be produced by reacting (a) an organoaluminum compound of the general formula $R_1R_2AlR_3$ wherein $R_1$ and $R_2$ are as defined above and $R_3$ is hydrogen or an alkyl group containing from 1 to 18 carbon atoms with (b) a low density polyethylene having a level of unsaturation of at least about 1 unsaturation site per thousand carbon atoms, said unsaturation including vinyl, vinylene and vinylidene unsaturation, a long chain branching frequency of about 0.0005 to about 0.005 per unit molecular weight and a weight average molecular weight of about 1000 to about 100,000 at a temperature of about 50° to about 200° C. for from about 0.5 to about 6 hours and recovering the reaction product.

The reaction product having the formula $R_1R_2AlR_p$ when employed together with a transition metal compound of a Group 4b, 5b, 6b, 7b and 8 transition metal of Mendeleev's Periodic Table of Elements as shown in the Chemical Rubber Company's Handbook of Chemistry and Physics, 56th edition, page B-3, and an organometallic co-catalyst wherein the metal is from Groups 1a, 2a, 2b, 3a or 4a of the Periodic Table is usefully employed for the polymerization of ethylene to linear polyethylene containing minor amounts of long chain branching.

Preferably the catalyst system will be employed for the production of high density polyethylene, nevertheless, the catalyst can be usefully employed for the production of low and medium density polyethylenes as well as linear low density polyethylene in order to obtain a polymer product with minor amounts of long chain branching.

DESCRIPTION OF THE PREFERRED EMBODIMENTS

The invention will now be described in greater detail together with illustrative examples, which examples are not to be construed in any limiting way.

The catalyst ingredient which provides the long chain branching is represented by the general formula $R_1R_2AlR_p$. $R_1$ and $R_2$ are the same or different hydrocarbyl groups and can have from 1 to about 18 carbon atoms. The hydrocarbyl groups can be branched or unbranched alkyl radicals, alkenyl, cycloalkyl, aryl, alkylaryl or arylalkyl radicals containing 1 to 18 carbon atoms. $R_p$ is a monovalent polymeric hydrocarbyl group having a weight average molecular weight of at least 1000 and a long chain branching frequency of about 0.0005 to about 0.005 per unit molecular weight.

Preferably, the $R_1$ and $R_2$ groups are methyl, ethyl, isobutyl, n-octyl, n-dodecyl and the like.

Most preferably, the $R_p$ polymeric hydrocarbyl group will have a molecular weight in the range of about 1000 to 20,000 and most preferably in the range of 5000 to 15,000 and a long chain branching frequency of from about 0.001 to about 0.004 per unit molecular weight and most preferably from about 0.002 to 0.003 per unit molecular weight.

The long chain branching frequency (LCB) can be represented by the equation $LCB = b/M_w$ wherein b is the weight average number of long chain branches per molecule and $M_w$ is the weight average molecular weight. The molecular weight averages and the long chain branching characteristics are determined by gel permeation chromatography and intrinsic viscosity methods. Gel permeation chromatography measurements were made on a Waters Associates Model 200 Gel Permeation Chromatograph. The viscosity measurements were made with a Precision Scientific Company Precision Kinematic Viscosity Bath Model "S".

The organoaluminum compounds containing the long chain branched hydrocarbyl groups are prepared by the well-known reaction of aluminum alkyls, especially dihydrocarbylaluminum hydrides and trihydrocarbylaluminum with olefinic materials containing terminal unsaturation. The reaction can be represented by the general equation:

$$RCH_2=CH_2 + i\text{-}Bu_2AlH \rightarrow RCH_2CH_2Ali\text{-}Bu_2$$

If R is represented by a low density polyethylene having a high vinyl, vinylene, and/or vinylidene content as well as long chain branching, there will be provided in accordance with the reaction, an organoaluminum compound wherein at least one of the valences is satisfied by the long chain branched group.

Accordingly, the organoaluminum compounds are prepared by reacting a dialkylaluminum hydride with a low molecular weight, low density polyethylene (LDPE) containing a high vinyl, vinylene, and vinylidene content. The LDPE will desirably have a level of unsaturation of about 1 to about 10 per thousand carbon atoms including a vinyl unsaturation of about 0.1 to about 3.5 per thousand carbon atoms preferably 1.0 to 1.5 and a vinylidene unsaturation of about 0.1 to about 3.5 per thousand carbon atoms. Preferably about 1.0 to about 1.5.

The LDPE will have a long chain branching frequency of about 0.0005 to about 0.005 per unit molecular weight and a weight average molecular weight of about 1000 to about 20,000. Desirably, the long chain branching frequency will be about 0.001 to about 0.004 per unit molecular weight and the weight average molecular weight of about 5000 to about 15,000.

The LDPE and the aluminum alkyl hydride can be reacted at a temperature of about 50° to about 200° C. for from about 0.5 to about 6 hours. The reaction is adequately described in T. Mole and E. A. Jeffery, *Organoaluminum Compounds*, Elsevier, New York, N.Y., 1972, p 67 which is incorporated herein in its entirety by reference.

The alkylaluminum hydrides employed in accordance with this invention are represented by the general formula $R_1R_2AlR_3$ and preferably $R_1R_2AlH$ wherein $R_1$, $R_2$ and $R_3$ are defined as above. In accordance with the preferred embodiment of this invention $R_3$ is H and $R_1$ and $R_2$ are alkyl groups having from 1 to 5 carbon atoms such as methyl, ethyl, i-propyl, n-propyl, isobutyl, n-butyl, pentyl; desirably 2 to 4 carbon atoms and most preferably $R_1$ and $R_2$ are each isobutyl radicals.

The molar ratio of the aluminum hydride to LDPE is determined by the number of vinyl and vinylidene groups in the LDPE. Preferably, the molar ratio of aluminum hydride to the vinyl plus vinylidene groups per thousand carbon atoms is in the range of 0.5 to 1 to about 5 to 1 and most desirably 1 to 1 to about 3 to 1.

Of the suitable transition metal compounds, those most advantageously employed are the compounds of titanium, vanadium and zirconium with those of titanium being most advantageous. The transition metal compounds can be the halides, oxyhalides, alkoxides, amides, acetylacetonates, alkyls, aryls, alkenyls and alkadienyls. Of the foregoing transition metal compounds, the alkoxides and the halides of titanium generally most beneficial and preferably the halides of titanium.

Of the titanates, preferred are the trivalent and tetravalent titanium, alkoxides or aryloxides, especially alkoxides having from 1 to 12 carbon atoms. Illustrative examples of the preferred titanates includes tetrabutoxytitanium, tetra(isopropoxy)titanium, diethoxytitanium bromide, dibutoxytitanium dichloride, n-butyl triisopropoxytitanium, ethyl dibutoxytitanium chloride, monoethoxytitanium trichloride, tetraethoxytitanium and the like. Of the preferred titanates, the tetravalent ones wherein all halogen atoms are replaced by alkoxide are most preferred with tetra(isopropoxy)titanium and tetrabutoxytitanium being especially preferred. Examples of other transition metal compounds which are advantageously employed are vanadium trichloride, vanadium tetrachloride, vanadium oxychloride, zirconium tetrachloride, titanocene dichloride, zirconium tetraalcoholates such as tetrabutoxyzirconium, vanadium acetylacetonate and the like.

Most preferably, the transition metal compounds employed in accordance with this invention are the metal tetra and trivalent halides such as, for example, titanium tetrachloride, titanium trichloride, titanium tetrabromide, titanium tribromide and the like.

The transition metal compound can be employed as is or the transition metal compound can be contained on a support or complexed with an organometallic compound. For example, titanium tetrachloride can be reacted with an organomagnesium compound represented by the general formula $MgR'R''$ wherein $R'$ and $R''$ can be the same or different alkyl groups having from 1-20 carbon atoms or complex thereof, with, for example, aluminum alkyls represented by the formula $AlR'''_3$ wherein each $R'''$ is an alkyl group having from 1-18 carbon atoms to obtain a highly precipitated solid. Illustrative organomagnesium compounds are for example $RMgX$, $R_2Mg$, $RMgOR$, $R_2Mg \cdot R_3Al$, $R_2Mg \cdot R_3B$, $R_2Mg \cdot R_2Zn$, $R_2Mg \cdot R_3Ga$ wherein R can be the same or different hydrocarbyl groups having from 1-18 carbon atoms such as ethyl, methyl, propyl, n-butyl, iso-butyl and the like. Preferably the solid is prepared by reducing $TiCl_4$ with the six to one complex of n-butyl ethyl magnesium with triethyl aluminum to provide a TiCl₃ complex represented by 7TiCl₃.AlMg₆nBu₃Et₅Cl₇. Further illustrative examples of titanium-magnesium-aluminum alkyl complexes which can be usefully employed and their preparations are described in U.S. Pat. No. 4,027,089 which disclosure is incorporated herein in its entirety.

The transition metal halides can be contained on a magnesium dichloride support. For example, magnesium dihalides can be ball milled with a titanium tetrachloride in the presence of a Lewis base and thereafter contacted with an aluminum trialkyl-Lewis base complex.

The transition metal halide is activated for polymerization purposes by means of the third component organometallic compound of a metal chosen from Groups 1 to 3 of the Periodic system. Suitable organometallic compounds are metal-alkyls, the halides or hydrides of metal-alkyls and Grignard compounds. Examples of suitable metals are aluminum, zinc, magnesium, sodium and lithium. Illustrative but non-limiting examples of organometallic compounds are trimethylaluminum, triethylaluminum, triisobutylaluminum, butyllithium, diethylaluminum chloride, diethylaluminum bromide, diethylaluminum hydride, diisobutylaluminum hydride, the sequihalides of aluminum and ethylmagnesium bromide. Most advantageous results are effected with the aluminum alkyls, the halides of aluminum alkyls and especially with triethylaluminum and triisobutylaluminum.

The molar ratio between the third component organometallic compound co-catalyst and the transition metal compound in the catalyst is not particularly critical and can, in general, vary from 10:1 to 1000:1, with preferred values of the order of .):1 tb 100:1.

Preferably the molar ratio of aluminumhydride-LDPE reaction product to titanium should be in the range of about 0.1:1 to about 10:1 and most preferably 0.5:1 to about 3:1, based on aluminum dialkyl portion of the reaction product.

The polymerization of ethylene in the presence of the described catalyst may be carried out according to all the known techniques: continuously or discontinuously, in the gaseous state, that is in the absence of any liquid medium, or in the presence of a dispersion medium in which the monomer is soluble. As dispersing mediums, an inert hydrocarbon, liquid under the conditions of polymerization, or the monomers themselves, maintained liquid under the saturation pressure, may be used.

The process according to the invention may be advantageously applied to the homopolymerization of ethylene and to its copolymerization with other alpha-olefins such as propylene, butene-1, and the like. Preferably the catalyst system is advantageously employed in the polymerization of ethylene to linear polyethylene containing minor amounts of long chain branches and preferably, to high density polyethylene containing minor amounts of long chain branches.

The polymers so obtained evidence improved die swell as determined by the measurements taken by the extrudate from an Instron Rheometer at shear rates of 3 reciprocal seconds and 300 reciprocal seconds, respectively. The swell improvement can be directly attributable to the introduction of terminal LDPE fragments containing long chain branches into a small fraction of the polyethylene molecules.

The invention is further described by means of the following examples which illustrate the best modes currently contemplated for carrying out the present invention but which must not be construed as limiting the invention in any manner whatsoever.

EXAMPLES 1-7 a. To a dry hypovial in a nitrogen atomsphere containing a magnetic stirring bar were introduced 1.5 grams Sanwax 171P (a low density polyethylene containing 1.15 vinyl groups per 1000 carbon atoms and 1.13 vinylidene groups per 1000 carbon atoms having a Mw of 12.5k and Mw/Mn of 6.5) and 4.2 grams of dry, degassed heptane. The vial was capped with a rubber septum and 0.19 grams of a 24.6% solution of diisobutylaluminum hydride (DIBAL—H) in heptane was charged. The ratio of DIBAL—H to vinyl groups is about 3. The vial was heated for 3 hours at 90°-100° C. and thereafter cooled to room temperature to yield a diisobutylaluminum LDPE containing LCB.

To the vial was added, using a syringe, 32.6 ml of a slurry (2.65 mg catalyst per ml) of the reaction product of TiCl₄ with butylethylaluminum to give 86.4 mg of catalyst containing 17.3 mg titanium. The mixture was heated to and maintained between 80°-90° C. for about 30 minutes with constant stirring.

To an autoclave reactor were charged in order, 800 ml of dry hexane, 0.48 mmoles Al(iBu)₃ and 1.20 ml of the slurry prepared above. The reactor was heated to 50° C. and pressured to 65 psig with hydrogen. The temperature was increased to 85° C. and ethylene was continuously introduced to maintain the pressure at 150 psig. The polymerization was continued for 40 minutes at 150 psig and 85° C. The polymer was isolated from solvent by evaporation and dried in a vacuum oven to constant weight. A total of 104 grams of polyethylene was obtained with an MI of 0.74 and an MIR of 42. Catalyst activity was 53 kg PE/g Ti/hr/atm C₂H₄.

The die swell of the recovered polymer was determined for S₃ and S₃₀₀ by extruding the polymer through a 1 inch×0.0603 inch capillary at 204.4° C. at a velocity of 3 and 300 reciprocal seconds on a Instrom Capillary Rheometer—Model TE.

Additional catalysts were prepared containing Sanwax reaction product with DIBAL—H (examples 3 & 5) with increased ratios of DIBAL—H—LDPE reaction product to Ti and, as a comparison, a catalyst prepared absent the DIBAL—H—LDPE reaction product (example 7) and absent DIBAL—H (examples 2, 4, and 6). The ratio of materials and results are summarized in Table I. The results clearly demonstrate an improvement in die swell which is directly attributable to the introduction of terminal fragments containing LCB into the HDPE. Introduction of Sanwax alone (examples 2, 4, and 6) is clearly not sufficient to cause the increased swell observed when the DIBAL—H/Sanwax reaction product is used (examples 1, 3, and 5).

EXAMPLES 8-10

The catalyst was prepared as in Example 1 except that the DIBAL—H/RCH=CH₂ ratio was 1.3. The ratio of materials and results are summarized in Table II. Again, increased swell of the HDPE is observed when the catalyst is treated with the DIBAL—H/Sanwax reaction product relative to a control run (example 10).

EXAMPLES 11-14

To demonstrate that the improved swell is attributable to the HDPE containing small amounts of LCB rather than an additive effect, the samples of the polymer recovered in Example 10 were doped with 0.05%, 0.10% and 1.0% Sanwax 171P. The results are summarized in Table III. The results demonstrate that a simple blending of Sanwax does not have any affect on die swell.

TABLE I

Rheological Properties of HDPE Produced with Catalyst Prealkylated with DIBAL—H/Sanwax Reaction Product ($DIBAL—H/RCH=CH_2 = 3$)

| Example HDPE No. | Catalyst (mg)[a] | Ti (mmoles) | DIBAL—H (mmoles) | Sanwax (mg) | DIBAL—H/Ti | TIBAL (mmoles) | Polymer (g) | Activity[b] | $S_3$ | $S_{300}$ |
|---|---|---|---|---|---|---|---|---|---|---|
| 1 | 2.55 | $1.07 \times 10^{-2}$ | $1 \times 10^{-2}$ | 44 | 1 | 0.48 | 104 | 53 | 1.41 | 1.54 |
| 2(control) | 2.55 | $1.07 \times 10^{-2}$ | 0 | 44 | 0 | 0.48 | 129 | 66 | 1.31 | 1.46 |
| 3 | 2.48 | $1.04 \times 10^{-2}$ | $2 \times 10^{-2}$ | 87 | 2 | 0.48 | 45 | 24 | 1.35 | 1.53 |
| 4(control) | 2.48 | $1.04 \times 10^{-2}$ | 0 | 87 | 0 | 0.48 | 124 | 65 | 1.29 | 1.45 |
| 5 | 2.57 | $1.07 \times 10^{-2}$ | $4 \times 10^{-2}$ | 180 | 4 | 0.48 | 29 | 15 | 1.36 | 1.55 |
| 6(control) | 2.57 | $1.07 \times 10^{-2}$ | 0 | 180 | 0 | 0.48 | 106 | 54 | 1.29 | 1.48 |
| 7(control) | 2.12 | $8.85 \times 10^{-3}$ | 0 | 0 | 0 | 0.40 | 101 | 62 | 1.33 | 1.49 |

[a]Mg of Ti—Mg—Al containing complex
[b]Activity expressed as kg/PE/gTi.hr.atmC$_2$H$_4$

TABLE II

Rheological Properties of HDPE Produced with Catalyst Prealkylated with DIBAL—H/Sanwax Reaction Product[a] ($DIBAL—H/RCH=CH_2 = 1.3$)

| Example No. | Catalyst (mg) | Ti (mmoles) | DIBAL—H (mmoles) | Sanwax (mg) | DIBAL—H/Ti | TIBAL (mmoles) | Polymer (g) | Activity[b] | $S_3$ | $S_{300}$ |
|---|---|---|---|---|---|---|---|---|---|---|
| 8 | 2.07 | $8.6 \times 10^{-3}$ | $3.9 \times 10^{-3}$ | 53 | 0.5 | 0.47 | 96 | 60 | 1.37 | 1.53 |
| 9 | 2.17 | $9.1 \times 10^{-3}$ | $1.0 \times 10^{-2}$ | 120 | 1.1 | 0.47 | 89 | 53 | 1.38 | 1.53 |
| 10 | 2.30 | $9.6 \times 10^{-3}$ | 0 | 0 | 0 | 0.47 | 93 | 53 | 1.28 | 1.46 |

[a]Mg of Ti—Mg—Al containing complex
[b]Activity expressed as Kg/PE/gTi.hr.atmC$_2$H$_4$.

TABLE III

Rheological Properties of HDPE Containing Various Amounts of Sanwax 171P

| Example Number | Wt % Sanwax 171P[a] Added to HDPE | $S_3$ | $S_{300}$ |
|---|---|---|---|
| 11 control | 0 | 1.30 | 1.49 |
| 12 control | 0.05 | 1.30 | 1.48 |
| 13 control | 0.10 | 1.37 | 1.42 |
| 14 control | 1.0 | [b] | 1.47 |

[a]A low density PE manufactured by Sanyo Petrochem
[b]Melt fracture occurred

The invention claimed is:

1. An ethylene polymerization catalyst comprising:
   (a). a Group 4B to 8 transition metal compound,
   (b). an organoaluminum compound of the general formula $R_1R_2AlR_p$ wherein $R_1$ and $R_2$ are the same or different hydrocarbyl groups having from 1 to 18 carbon atoms and $R_p$ is a polymeric hydrocarbyl group having a weight average molecular weight in the range of about 1000 to about 100,000 and a long chain branching frequency of about 0.0005 to about 0.005 per unit molecular weight, and
   (c). an aluminum alkyl cocatalyst.

2. The ethylene polymerization catalyst of claim 1 wherein $R_1$ and $R_2$ contain from 1 to 8 carbon atoms.

3. The ethylene polymerization catalyst of claim 2 wherein $R_1$ and $R_2$ are each isobutyl groups and $R_p$ has a weight average molecular weight of about 1000 to about 20,000.

4. The ethylene polymerization catalyst of claim 1 wherein the Group 4B to 8 transition metal compound is a titanium halide.

5. The ethylene polymerization catalyst of claim 4 wherein the titanium halide is obtained from the reaction product of titanium tetrachloride with an organomagnesium compound or complexes thereof.

6. The ethylene polymerization catalyst of claim 5 wherein the organomagnesium complex is obtained by reacting a magnesium compound of the general formula MgR'R" with AlR''' at a molar ratio of about 0.5:1 to about 200:1, wherein R' and R" can be the same or different alkyl groups having from 1 to 18 carbon atoms and R''' is an alkyl group having from about 1 to about 18 carbon atoms.

7. The ethylene polymerization catalyst of claim 6 wherein R' is the n-butyl group, R" and R''' are ethyl groups and the molar ratio is about 6:1.

8. The ethylene polymerization catalyst of claim 1 wherein the transition metal compound is on a support.

9. The ethylene polymerization catalyst of claim 8 wherein the transition metal compound is titanium tetrachloride.

10. The ethylene polymerization catalyst of claim 8 wherein the support is MgCl$_2$.

* * * * *